United States Patent [19]

Kumar

[11] Patent Number: 5,245,294

[45] Date of Patent: Sep. 14, 1993

[54] METHOD FOR EVALUATING OPERABILITY OF FILTER COMPONENTS IN POWER CONVERSION SYSTEM

[75] Inventor: Ajith K. Kumar, Erie, Pa.

[73] Assignee: General Electric Company, Erie, Pa.

[21] Appl. No.: 666,832

[22] Filed: Mar. 8, 1991

[51] Int. Cl.$^5$ ............................................. G01R 27/26
[52] U.S. Cl. .................................... 324/677; 324/678; 340/870.37
[58] Field of Search ....................... 324/676, 677, 678; 340/870.37; 318/375, 376

[56] References Cited

U.S. PATENT DOCUMENTS

| 3,453,535 | 7/1969 | Anglin | 324/677 |
| 3,890,551 | 6/1975 | Plunkett | 318/376 |
| 4,065,715 | 12/1977 | Jaffe et al. | 324/678 |
| 4,460,866 | 7/1984 | Feuerbaum et al. | 324/678 |
| 4,470,008 | 9/1984 | Kato | 324/676 |
| 4,516,077 | 5/1985 | Fenneman et al. | 324/678 |
| 4,558,274 | 12/1985 | Carusillo | 324/678 |
| 4,853,718 | 8/1989 | El Hatem et al. | 324/678 |
| 5,042,299 | 8/1991 | Wells | 324/678 |
| 5,073,757 | 12/1991 | George | 324/677 |

Primary Examiner—Kenneth A. Wieder
Assistant Examiner—Maura Regan
Attorney, Agent, or Firm—R. Thomas Payne

[57] ABSTRACT

A method for measuring capacitance in a power conversion system by measuring the time rate of discharge of the capacitance means and computing the value of capacitance corresponding to the measured discharge rate and a method for verifying that a filter in the power conversion system is effective for suppressing preselected frequencies corresponding to signalling frequencies used in a transit system. In this latter form, the system periodically initiates a self-test function in which the preselected frequency is injected into the system for verifying that the system will detect signals at the preselected frequency.

14 Claims, 5 Drawing Sheets

METHOD FOR EVALUATING OPERABILITY OF FILTER COMPONENTS IN POWER CONVERSION SYSTEM

This invention relates to electric power conversion systems for conveying power between a direct current (DC) source and an electric load circuit and, more particularly, to a method for evaluating operability of selected components and circuits in such conversion systems without disassembly of such systems.

BACKGROUND OF THE INVENTION

Electric power conversion systems are used to condition the electric power supplied to motor load circuits from a DC source of relatively constant voltage. If supplying DC motors, such a system will include an electric power "chopper" that is suitably controlled to vary the magnitude of load current and/or voltage as desired. Alternatively, in the case of alternating current (AC) motors, the system will include an electric power "inverter" that is suitably controlled to vary the amplitude and frequency of load voltage as desired. In either case, electric power flows from the DC source terminals to the load terminals of the controllable converter during "motoring" operation or in a reverse direction during "electrical braking".

Such a system is useful for propelling a rapid transit vehicle, in which case the source comprises a wayside conductor and the load comprises windings of at least one traction motor whose rotatable shaft is mechanically coupled through torque-increasing gearing to an axle-wheel set of the vehicle. The wayside conductor is typically energized by a relatively low voltage DC power generating plant located near the right of way along which the vehicle travels. In its motoring or propulsion mode of operation, the converter is so controlled that the DC voltage applied to its source terminals is converted into adjustable voltage at its load terminals, and the traction motor(s) responds by producing torque to accelerate the vehicle or maintain its speed as desired.

In the alternative electrical braking or retarding mode of operation of the power conversion system, the converter is so controlled that each motor acts as a generator driven by the inertia of the vehicle and supplies electric power which flows in a reverse direction through the converter and appears as direct and unipolarity voltage at the source terminals. As this electrical energy is used or dissipated, the traction motor(s) responds by absorbing kinetic energy and slowing the vehicle. Electrical braking is achieved by a combination of dynamic braking and regenerative braking. Dynamic braking is effected by connecting a dynamic braking resistance between the DC source terminals. This resistance receives current from the converter, converts the electrical energy to thermal energy, and dissipates the resulting heat. Regenerative braking, on the other hand, is effected by returning to the DC power source power flowing in a reverse direction through the converter during braking operation. These two electrical braking modes can be combined in desired proportions, this mixing process being commonly referred to as "blending".

A power conversion system including a voltage source inverter for supplying AC traction motors is disclosed in U.S. Pat. No. 3,890,551—Plunke assigned to General Electric Company. An important feature of the Plunkett power conversion system is its inclusion of ohmic resistance (shown at 28 in FIG. 1 of the Plunkett patent) that is inserted into the DC link between the inverter and the DC power source during electrical braking but is effectively removed from the DC link during motoring. By inserting this series resistor during electrical braking, the magnitude of voltage at the DC terminals of the inverter can increase above that of the source voltage. One of the advantages of raising the inverter voltage is to enable the traction motors to develop more magnetic flux for braking and to use less current than would otherwise be required for very high braking effort.

The power conversion system of the Plunkett patent also includes a low pass electrical filter of the conventional series inductance (L), shunt capacitance (C) type between the voltage raising resistor and the inverter for attenuating harmonics generated by operation of the inverter and for partially isolating the inverter from undesirable line transients. (As used herein, the term "harmonics" refers to various components of the composite current and voltage waveforms having frequencies that are multiples of the frequency of the fundamental component of such waveforms.) In addition, the shunt capacitance of the filter at the DC terminals of the inverter provides the "stiff" voltage required for proper operation of a voltage source inverter.

The desired blending of dynamic and regenerative braking can be accomplished in various different ways that are well known to persons skilled in the art. See, for example, U.S. Pat. No. 4,093,900—Plunkett. In the present state-of-the-art, it is preferable to replace the parallel array of separate braking resistors and their respectively associated electromechanical switches, as shown in U.S. Pat. No. 4,093,900, with a single bank of resistance elements connected to the DC link via an electric power chopper comprising a controllable solid-state electric valve that can be repetitively turned on and off in a pulse width modulation (PWM) mode to control the average magnitude of current in the resistor as desired. An example of this modern practice is disclosed in U.S. Pat. No. 4,761,600—D'Atre et al., where the electric valve comprises a main thyristor for commutating the main SCR from a conducting state (on) to a non-conducting or current blocking state (off). Alternatively, a solid-state gate turn-off device (GTO) could be substituted for the chopper shown in U.S. Pat. No. 4,761,600.

The filter capacitors used to provide the filtered DC link voltage in the above described systems are generally electrolytic capacitors and have a higher failure rate than many other power components. Typically, the filter capacitors may range from 10000 to 100,000 microfrads (MFD) and are formed from a plurality of parallel connected capacitors. For example, as many as 112 individual capacitors may be d to create a single 55,000 MFD capacitance means. One of the primary functions of these capacitors, in addition to "smoothing" the DC link voltage is to reduce certain frequencies of current which can be introduced to the wayside conductors DC power source from the propulsion system. As is well known, such wayside conductors are often positioned adjacent wayside signalling equipment in transit applications. The signalling equipment may operate at preselected frequencies, such as, for example, 25 Hz, 60 Hz, 95 Hz, 200 Hz, or such other frequency as the transit authority may select. The signalling system may be used for communication to transit vehicles operating in the system or to indicate the presence of a transit vehicle within a particular block of the transit system. Other frequencies, such as 360 Hz, 720 Hz, and 990 Hz, are used for safety checks as is explained in copending U.S. patent application Ser. No. 07/630,698, filed Dec. 20, 1990, and assigned to the assignee of the present invention, the disclosure of which is hereby incorporated by reference. Because of the importance of the signals on the signalling system, it is desirable that transit vehicles not generate signals in their respective propulsion systems which might interfere with the signalling system. To this end, the values of the capacitance means and the inductance means in the power filter circuit are selected to avoid oscillations or ringing at signalling frequencies or harmonics of these frequencies. However, as noted above, the electrolytic capacitors used in the filter circuits are known to have higher failure rates than other components. Accordingly, it is desirable to provide a method for periodically verifying the value of the capacitance means so that capacitors whose value has changed may be replaced. Such maintenance not only assures integrity of the filter circuit but can be used to direct maintenance personnel to the capacitors in case of degradations and assures smoother operation of the propulsion system with adequate capacitance means.

As discussed above, the capacitance means also operates in conjunction with the electrical braking system for the transit vehicle. A more detailed description of the operation of an electrical braking system may be had by reference to U.S. Pat. No. 4,904,918—Bailey et al., issued Feb. 27, 1990 and assigned to the assignee of the present invention. During electrical braking of the transit vehicle, the capacitance means is called upon to attenuate harmonics generated by the operation of the chopper in varying the dynamic braking resistance.

SUMMARY OF THE INVENTION

It is a general object of the present invention to provide a method for verifying integrity of selected components in a power conversion system without requiring disassembly of the system.

It is another object of the present invention to provide a method for determining the capacitance of filter capacitance means in a power filter circuit without disassembly of the power filter circuit.

It is still another object of the present invention to provide a method for verifying frequency characteristics of a power filter circuit in a power conversion system.

The above and other objects will be in part apparent and in part pointed out in the description to follow. In general, the invention is illustrated as a method for measuring capacitance in a power conversion system by measuring the time rate of discharge of the capacitance means and computing the value of capacitance corresponding to the measured discharge rate. In another form, the invention is illustrated as a method for verifying that the filter in the power conversion system is effective for suppressing preselected frequencies corresponding to signalling frequencies used in a transit system. In this latter form, the system periodically initiates a self-test function in which the preselected frequency is injected into the system for verifying that the system will detect signals at the preselected frequency.

In the first form, capacitance is checked periodically such as when the filters are discharged when the vehicle is at rest and no input voltage is connected to the filter circuit. The check is implemented by connecting filter discharge resistors across the capacitance means, waiting for the filter voltage to drop below the normal input line voltage so that any auxiliary equipment is disconnected from the filter, measuring the time for the filter voltage to discharge to a preselected fraction of the voltage at the start of the check, calculating the capacitance from the known capacitance-resistance-time relationship, and correcting the calculating value for ambient temperature. The system may store deviations for later recall for maintenance or, if severe, inhibit operation of the vehicle.

In the second form, the propulsion system continuously monitors selected frequencies on the input power lines and forces a shut-down of the propulsion system if the monitored frequencies have an amplitude above a predetermined minimum value. Periodically, the propulsion system automatically switches to a self-test mode when the system is not in a motoring or braking mode. The frequency monitoring system detects current/voltage on the input power lines and couples signals from the current/voltage detector to a band-pass filter set at a frequency of interest (the signalling frequency used on the transit system). The output from the band-pass filter is supplied to an analog-to-digital (A/D) converter and from there to a microcomputer controlling the propulsion system. Operation of the monitoring system is verified by periodically injecting a signal at the frequency of interest into the band-pass filter and confirming detection at the microcomputer. This self-test feature eliminates the need for redundant systems common in the prior art.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
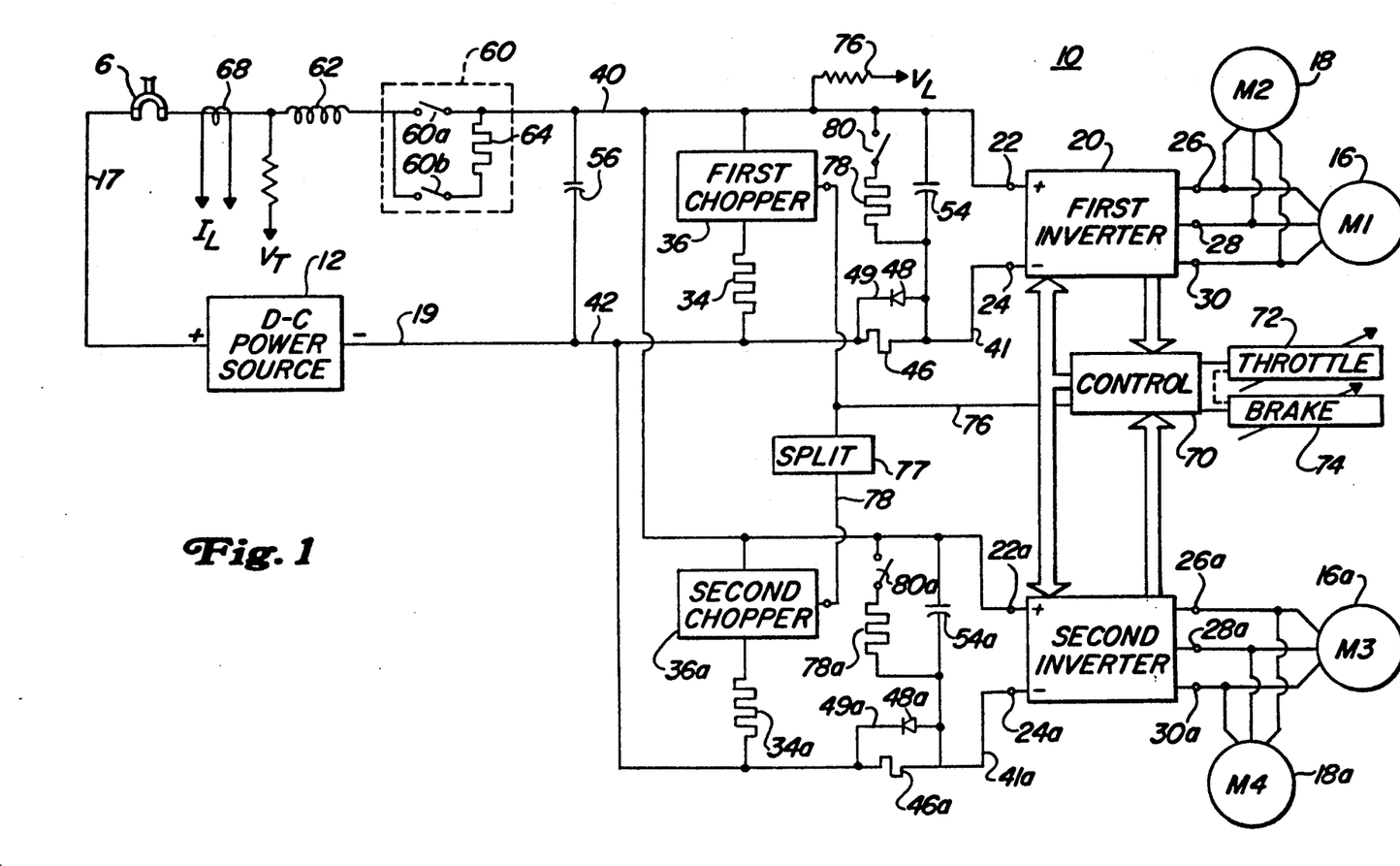
FIG. 1 is a simplified partial block diagram, partial schematic of a power system for an electric traction motor vehicle useful in explaining the present invention.

Referring now to FIG. 1, there is shown a power conversion system 10 for conveying power between a DC power source 12 and an electric load comprising first and second motors 16 and 18 electrically connected in parallel. In one application of the invention, the motors 16 and 18 are three-phase AC induction-type traction motors used for propelling a transit vehicle (not shown), and the DC source 12 comprises a wayside power distribution system including either a third rail or an overhead catenary with which a current collector on the vehicle makes sliding or rolling contact. In FIG. 1, the relatively positive line 17 represents such a current collector, and the negative line 19 represents a conductor in contact with a grounded rail serving as the other terminal of the DC source. Alternatively, the power conversion system 10 on board the vehicle may be connected to the source via a two-wire trolley in contact with two parallel conductors of an overhead catenary. The magnitude of the unipolarity voltage between the lines 17 and 19 is typically in a range from 600 volts normal to 800 volts maximum, and each of the motors 16 and 18 typically has a full-load rating on the order of 300 horsepower more or less.

The power conversion system 10 includes a controllable converter 20 which, in the illustrated embodiment of the invention, is a voltage source inverter having a pair of DC terminals 22 and 24 on its source side and a set of three AC terminals 26, 28, and 30 on its motor side. The DC terminal 22 is connected via a conductor 40 to the lines 17 of the positive potential, and the terminal 24 is connected via relatively negative conductors 41 and 42 to the other lines 19 of the DC power source 12. The conductors 40–42 thus serve as a DC link between the source 12 and the inverter 20. The AC terminals 26, 28, and 30 are respectively connected to the three different phases of each of the AC motors 16 and 18.

During motoring, i.e., when electrical power is being conveyed from the source to the motors, direct current is supplied to the inverter through its DC terminals 22 and 24, and the inverter acts to convert this direct current into alternating current supplied through AC terminals 26, 28, and 30 to the motors 16 and 18. The inverter is of a conventional design and includes suitable controls (not shown in FIG. 1) for varying the amplitude and frequency of the alternating voltage at its AC terminals to provide the needed acceleration or deceleration of the vehicle driven by the motors 16 and 18. The well known pulse width modulated (PWM) control strategy can be used. Examples of useful inverters are disclosed in U.S. Pat. Nos. 3,890,551 and 4,761,600. In modern practice, GTO devices are preferred as the main controllable electrical valves of the inverter, thereby avoiding the need for auxiliary thyristors and commutation circuits. The power conversion system 10 has alternative motoring and electrical braking modes of operation. During electrical braking, each of the motors 16 and 18 operates as an electrical generator driven by the inertia of the transit vehicle, returning power to the system 10. This return power flows through the inverter 20 in a reverse direction from the direction of flow during motoring and appears as a unipolarity voltage and direct current at the DC terminals 22 and 24.

The conversion system 10 is designed to provide for both dynamic braking and regenerative braking. Dynamic braking is effected by connecting across the conductors 40 and 42 of the DC link a dynamic braking resistance 34 through which at least some of the braking current can be made to flow, thus dissipating electric energy in the form of heat. For controlling current in the resistance 34, an electric power chopper 36 is connected in series therewith. As is well known to persons skilled in the art, the chopper 36 is a solid-state switch that can be repetitively turned on and off by suitable control means (not shown in FIG. 1) that, in one form, controls the ratio of the "on time" to the "off time" during successive intervals each of fixed duration. The average magnitude of current in the resistance varies directly with this ratio.

Regenerative braking is effected by returning reversely-flowing power to the DC source 12. During this mode of braking, braking current from the DC terminals 22 and 24 flows through the source 12 via the DC link conductors 40, 41, and 42. Regenerated power can be used for propelling other vehicles connected to the wayside conductor and then drawing power from the same source. But, as noted in U.S. Pat. No. 4,093,900, there are many instances when a power source is not receptive enough to use all of the electrical braking energy, and in such instances some energy must be dissipated in the dynamic braking resistance 34. The chopper control is able to sense such conditions and to respond by varying the on-off ratio of the chopper appropriately. One approach for controlling electrical braking is to use only the regenerative braking mode as long as the resulting braking effort is sufficient, but to blend in dynamic braking effort when regenerative braking effort drops below the desired level.

For increasing the effectiveness of the braking action, additional ohmic resistance means 46 is connected between the two negative conductors 41 and 42 on one side of the DC link so that it is in the path of current flowing from the relatively negative line 19 of the DC power source 12 and/or the dynamic braking circuit 34, 36 to the negative DC terminal 24 of the inverter during electrical braking. This resistance means 46 is shunted by a bypass circuit 49 including suitable means 48, such as the illustrated diode, for effectively removing the resistor 46 from the DC link during monitoring (i.e., when current in the conductors 41 and 42 flows in the direction of arrow 47 from the negative DC terminal 24 of the inverter 20 to the negative line 19 of the source 12). The diode 48 in the bypass circuit 49 is poled, as is shown in FIG. 1, to present negligible resistance to current in the direction of the arrow 47, but during electrical braking it blocks current which now flows in an opposite direction through conductors 41 and 42, thereby forcing such current to flow through the resistor 46. By thus effectively inserting the resistor 46 into the path of braking current, the voltage developed between the DC terminals 22 and 24 of the inverter will have a substantially higher magnitude than the voltage between conductors 40 and 42 of the DC link. Consequently, the amplitude of the motor voltage will rise above the magnitude of source voltage when the motors are acting as generators during electrical braking.

Such increased voltage is highly advantageous because it enables the motors to develop more flux for braking, and very high braking effort can be obtained with less current than would otherwise be possible. In a typical transit vehicle, the peak braking power will be much higher than the maximum power for propulsion. Keeping the maximum current as low as possible during braking has the additional benefit of avoiding the need for larger diameter and more expensive solid-state electrical valves in the inverter 20. This action and its other advantages are explained in more detail in the previously referenced U.S. Pat. No. 3,890,551. It is apparent that the extra resistor 46 will always absorb a portion of the electrical braking power even when the source 12 is highly receptive and there is no current in the dynamic braking circuit 34, 36. During regenerative braking, the resistor 46 provides an additional benefit: it helps to isolate the inverter 20 from the voltage between the lines 17 and 19, which voltage may experience sudden magnitude swings in either a positive or negative direction and lasting for many milliseconds due to lightning strokes, opening and closing of line breakers, or the like. The presence of the resistor 46 gives the inverter control circuits some additional time to respond to these sudden voltage changes in a safe and controlled manner.

For attenuating harmonics generated by operation of the power conversion system 10 and for effectively isolating the system from any undesirable electrical transients in the DC power source 12, a single-stage electrical filter of the L-C type is included in the connections between the source 12 and the inverter 20. This filter comprises a series line-filter inductance means 62 connected in the path of current between the line 17 and the positive conductor 40 of the DC link, and shunt capacitance means 54, 56. In accordance with the present invention, the shunt capacitance means actually comprises two separate parallel banks of capacitors. The first capacitance means 54 (referred to as the DC link capacitor) spans the conductors 40 and 41 and thus is directly connected between the two DC terminals 22 and 24 of the inverter. The second capacitance means 56 (referred to as the line capacitor) spans the conductors 40 and 42 and thus is interconnected in parallel with the capacitance means 54 via a circuit that includes the additional resistor 46 and its bypass circuit 49. During motoring, the bypass circuit around the resistor 46 is in its low resistance state as described above, essentially the same voltage is applied across both of the capacitors 54 and 56, and the effective value of capacitance in the filter is the sum of the capacitance values of the capacitors 54 and 56. But during electrical braking (when braking current is flowing in a direction opposite to the arrow 47), the resistor 46 is inserted in the path of braking current between the line capacitor 56 and the DC link capacitor 54, and the voltage magnitude across the former capacitor will now be less than the voltage across the capacitor 54 by an amount equal to the voltage drop across resistor 46.

In either mode of operation, the filter serves to attenuate harmonics generated by operation of the inverter 20 so that such harmonics are isolated from the DC source 12 and will not interfere with the usual wayside signalling system. During motoring, the DC link capacitor 54 serves mainly as the required "stiff" voltage source for the inverter 20. In the electrical braking mode of operation, the line capacitor 56 serves mainly as a filter for the chopper 36, providing a temporary path for braking current during the off periods of the chopper in the dynamic braking circuit 34, 36 which, as can be seen in FIG. 1, is connected across this capacitor. In addition to attenuating chopper-generated harmonics, the filter cooperates with the resistor 46 to dampen the inverter-generated harmonics during electrical braking.

For disconnecting the power conversion system 10, an electric circuit breaker 60, applied in a conventional manner, is provided between the system and the DC power source. This circuit breaker 60 is operated by the control 70 in response to an operator's command or to fault conditions forcing the circuit breaker to an open condition. The line breaker 60 incorporates two separately controllable contactors 60A and 60B. Contactor 60A provides a direct connection between line filter inductance means 62 and the DC link conductor 40. Contactor 60B is in series with a line filter resistor 64 and provides a resistive connection between inductance means 62 and conductor 40. In operation, contactor 60B is first closed so that charging of the filter capacitance means 54, 56 occurs through resistor 64 in order to limit initial current since the capacitance means appears as a short-circuit at power turn-on. Once the capacitance means 54, 56 has charged to substantially the value of the power source 12, the contactor 60A is closed and shunts the resistor 64. Typically, the resistor 64 may have a value of about 1.04 ohms.

In the illustrative system of FIG. 1, the closed contactor 66 represents a current collector in sliding contact with a wayside conductor. The contactor 66 may be a pantograph for an overhead conductor or a spring biased shoe for contacting a third rail as described in the aforementioned U.S. patent application Ser. No. 07/630,698.

Current to the propulsion system is monitored by a current monitor 68 of a type well known in the art. Monitor 68 generates a signal $I_L$ representative of the magnitude and frequency of current in the DC conductor 40. The voltage at DC link conductor 40 is indicated by signal $V_L$ obtained through buffer resistor 76 connected to conductor 40.

The filter capacitance means 54, 56 can be discharged through discharge resistance means 78 via discharge contactor 80. The discharge of capacitance means 54, 56 may be desirable for safety during maintenance.

In a typical transit vehicle, there will be a second voltage source inverter, in addition to the inverter described above, for supplying alternating current to two more traction motors for propelling the vehicle. FIG. 1 illustrates a power conversion system including such an additional inverter and with third and fourth AC motors being connected to the set of the AC terminals on its motor side. Components common to those described above are designated by the same reference numerals plus the suffix "a".

The positive DC terminals 22a on the source side of the second inverter 20a is connected, via the conductor 40 of the DC link, to the line 17 of positive potential, and the relatively negative DC terminal 24a is connected, via a separate conductor 41a and the common conductor 42, to the other line 19 of the DC power source 12. The AC terminals 26a, 28a, and 30a of the inverter 20a are respectively connected to three different phases of each of the AC motors 16a and 18a. A second DC link capacitor 54a individually associated with the inverter 20a, is directly connected between the DC terminals 22a and 24a, and a line capacitor 56 shared by both of the inverters 20 and 20a and both of the choppers 36 and 36a spans the conductors 40 and 42 of the DC link capacitors 54 and 54a during the motoring mode of operation of the conversion system.

As is shown, a second dynamic braking circuit, comprising the series combination of another dynamic braking resistor 34a and a second electric power chopper 36a, is connected between the DC link conductors 40 and 42 and hence across the line capacitor 56. A second additional ohmic resistance means 46a bypassed by a diode 48a is connected in the path of current between the capacitors 54a and 56. The diode 48a is poled to conduct DC link current during motoring, thereby effectively short circuiting the resistor 46a. But, it blocks current during electrical braking so that the resistor 46a is then inserted in the braking current path and causes a substantially higher voltage to develop across the DC link capacitor 54a than across the line capacitor 56. As before, the current path between the capacitors 54a and 56 is characterized by the absence of appreciable inductance.

In addition to sharing the common shunt line capacitor 56, the two inverters 20 and 20a utilize the same series line-filter inductance means 62 which is connected on the DC power source side of the capacitor 56 between the DC link conductor 40 and the line 17.

The two inverters 20 and 20a are controlled from a common control means 70 which responds to alternative command signals from interlocked throttle and brake controllers 72 and 74, respectively. The control means 70 also receives feedback signals representative of sensed values of voltage, current, and other selected variables in each of the inverters 20 and 20a. To operate in a dynamic braking mode, the control means 70 derives a train of suitably timed periodic signals that determine the repetitive on and off intervals of the choppers 36 and 36a, and it varies the ratio of these intervals as desired. This signal train is fed over a line 76 to the first chopper 36 and also to suitable means 77 for splitting it into a separate train of periodic signals that are displaced from the signals of the original train on the line 76 by a length of time corresponding to approximately one-half the period of such signals. The separate signal train is fed over a line 78 to the second chopper 36a. In this manner, the two choppers are coordinated so as to operate alternately rather than in unison. That is, the "on" periods of chopper 36a are staggered in time with respect to the "on" periods of chopper 36. This staggering reduces the amplitude and increases the frequency of the braking current traversing the line capacitor 56, thereby making it much easier for this capacitor, which is then acting as a filter for attenuating the harmonics generated by operation of both of the choppers, to perform its filtering function.

Figure 2:
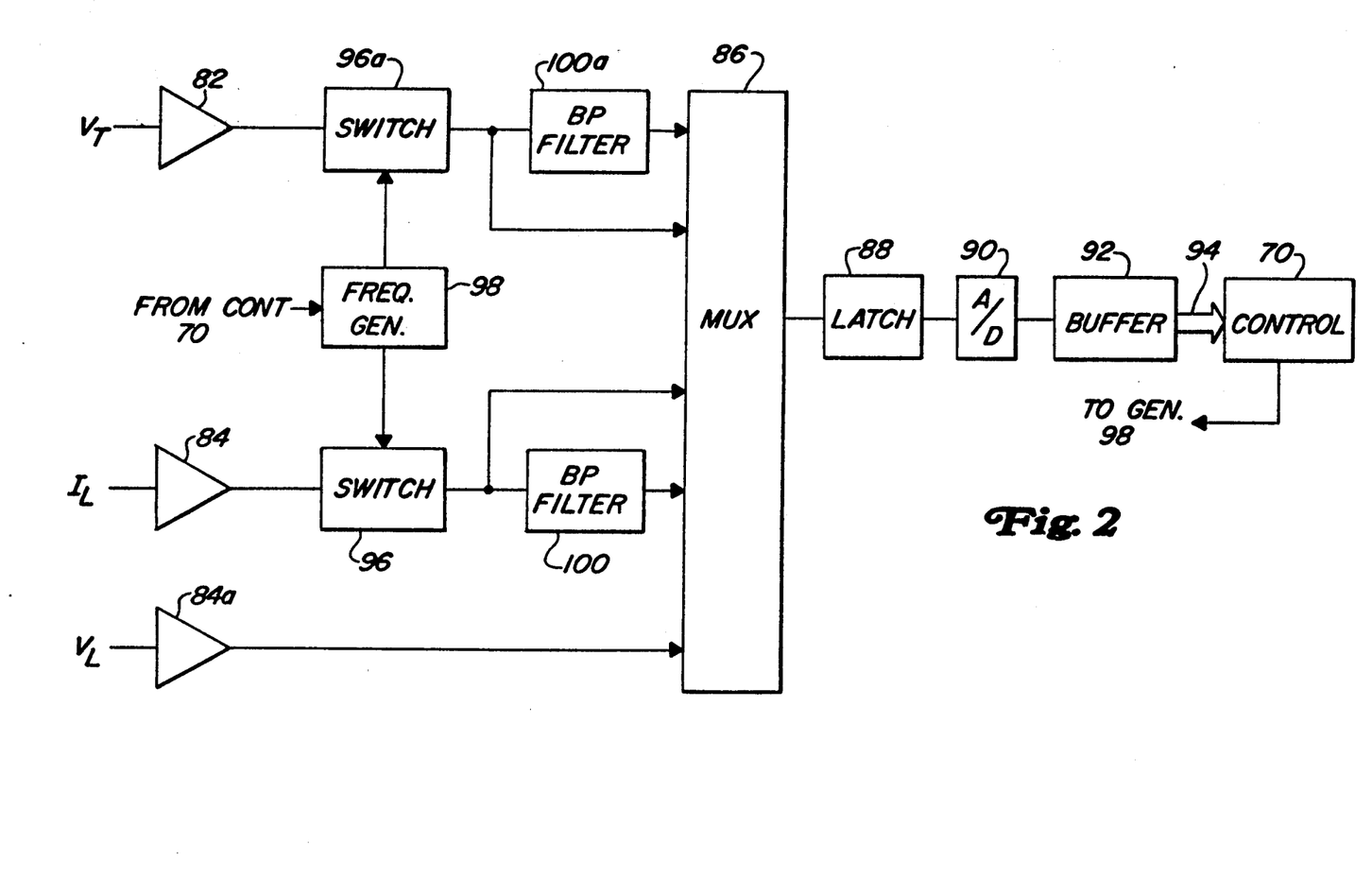
FIG. 2 is a simplified block diagram of a filter check circuit in accordance with one aspect of the present invention.

As previously discussed, it is critical to the operation of the propulsion system for transit vehicles that frequencies corresponding to signalling frequencies not be induced into the input power system 12 by the propulsion system. Continuous monitoring of the line current $I_L$ by the control 70 is utilized to assure that such signal frequencies are not present in line current. Referring to FIG. 2, there is shown a simplified block diagram of a part of the propulsion control system including the monitoring of line voltage $V_L$, wayside conductor voltage $V_T$, and line current $I_L$. Each signal $V_L$, $V_T$, and $I_L$ is coupled through respective buffer circuits 82, 84a, and 84. The signals from buffers 82, 84 are coupled to input terminals of electronic switches 96a and 96, respectively. The switches 96a, 96 are arranged to pass either the signals from the respective buffers 82, 84 or signals from a frequency generator 98. The signals developed at the output terminals of switches 96, 96a are coupled to input terminals of corresponding band-pass filters 100, 100a and also to selected input terminals of a multiplexer (MUX) 86. Signals developed at the output terminals of each of the filters 100, 100a are also coupled to selected input terminals of MUX 86. The wayside conductor voltage signal $V_T$ is coupled directly from buffer 84a to MUX 86. For purpose of illustration, the various components such as resistors, diodes, capacitors, and other active devices have been omitted with the understanding that the use of such devices is well known in the art and they are subsumed within the blocks shown in FIG. 2. A selected signal from MUX 86 is coupled through a sample and hold circuit (latch) 88 and applied to an analog-to-digital (A/D) converter 90. The digitized output of A/D converter 90 is coupled through a buffer 92 onto address/data lines 94 for application to control 70. It will be appreciated that control 70 is a microcomputer based control which can be programmed in a manner well known in the art to implement various selected control functions.

Figures 3, 4:
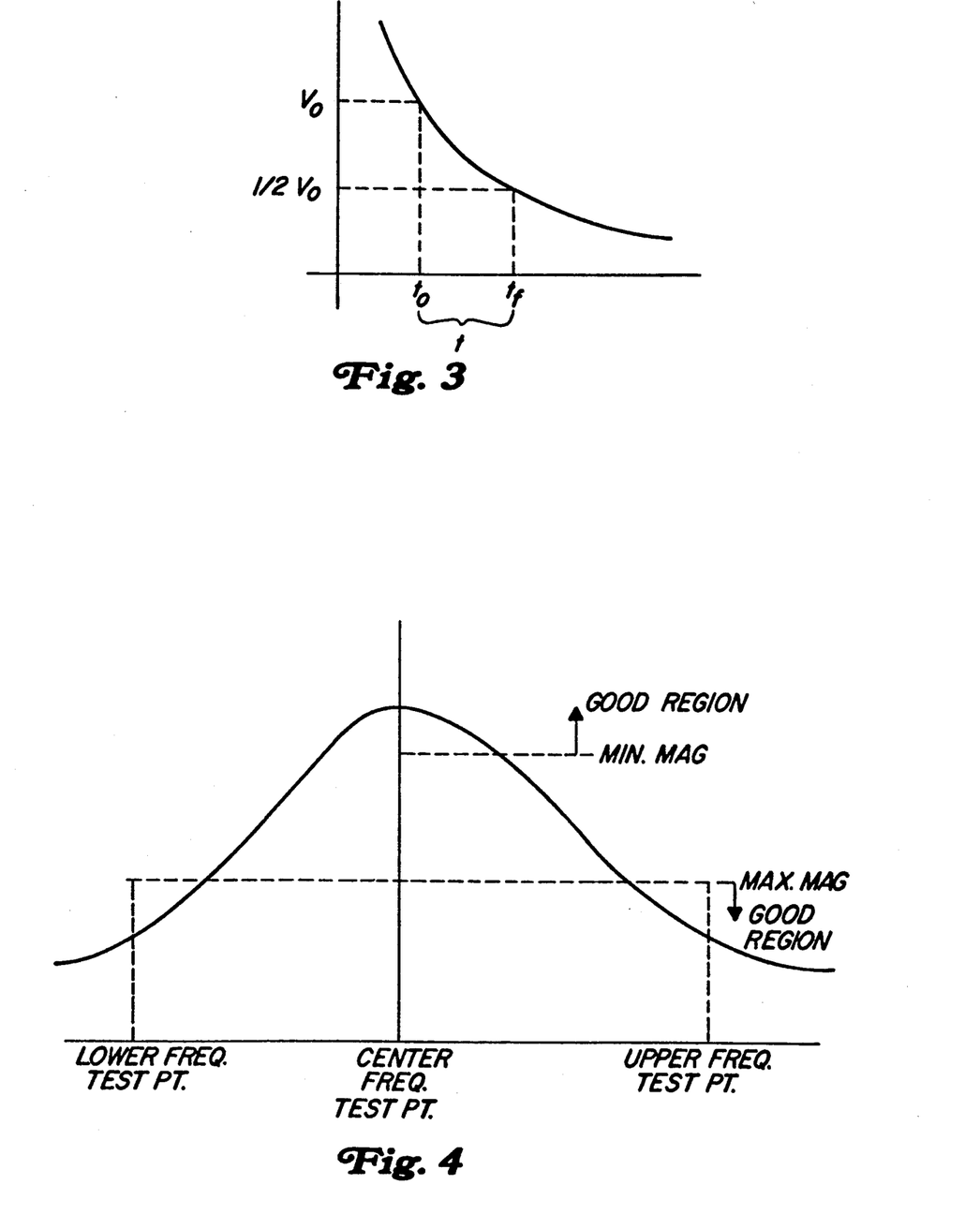
FIG. 3 is a capacitor discharge characteristic used in one form of the present invention.
FIG. 4 is a band-pass filter characteristic used in another form of the present invention.

The apparatus of FIG. 2 as thus far described is capable of monitoring line voltage $V_L$ and line current $I_L$ and controlling the propulsion system in response to various programmed instructions as a function of those responses. One function which can be performed is the evaluation of the values of the capacitance means 54, 54a, and 56. Turning briefly to FIG. 3, there is shown a graph of voltage $V_L$ when the capacitor discharge contactors 80, 80a are closed and no other loads are connected to capacitance means 54, 54a, and 56. In order to assure that all other loads are disconnected, the capacitance value check is only conducted when the transit vehicle is in a non-operating mode, i.e., the vehicle is neither in a propulsion nor a braking mode. Additionally, certain characteristic operating states are utilized such as, for example, automatic disconnection of the battery charge circuit when $V_L$ drops to about 400 volts. However, it is desirable that the check be started when $V_L$ is greater than about 300 volts to assure accuracy. Of course, the voltage $V_L$ must be less than the voltage of source 12 to assure that the system is not in an electrical braking mode. Given these conditions, the control 70 can select a starting voltage $V_O$, compute a preselected fraction of that voltage, for example $\frac{1}{2} V_O$, and thereafter determine the time for the capacitance means to discharge so that $V_L$ equals $\frac{1}{2} V_O$. The capacitance value is then computed from the time and the known value of resistors 78 and 78a in accordance with the equation $V = V_O e^{-t/T}$, where V is $\frac{1}{2} V_O$, t is the time for the voltage to drop from $V_O$ to $\frac{1}{2} V_O$, and T is the time constant equal to RC, where R is the value of the parallel combination of resistors 78 and 78a and C is the value of the combination of the capacitance means 54, 54a, and 56. Variations in capacitance as a function of temperature is known to occur. Accordingly, it is desirable to adjust the computed capacitance value as a function of temperature. In general, capacitance varies non-linearly with temperature. However, for purposes of this invention, it has been found sufficient to represent a typical capacitor response by three piece-wise linear segments, a first segment for temperatures equal to or exceeding 34° C., a second segment for temperatures between −2° C. and 34° C., and a third segment for temperatures of −2° C. or less. In the first segment, corrected capacitance $C_1$ is computed from the expression $$C_1 = \left[ \frac{0.89 * T + 100}{100} \right] C_0,$$

where T is temperature in degrees C, and $C_O$ is the measured capacitance. In the second segment, $$C_1 = \left[ \frac{4.7 * T + 864}{1000} \right] C_0.$$

In the third segment, $$C_1 = \left[ \frac{9.3 * T + 879}{1000} \right] C_0.$$

A typical capacitance curve for variation as a function of temperature may be seen in Sprague Engineering Bulletin No. 3431E, "Capacitance Ratio vs. Temperature at 120 Hz".

While the above described check verifies the integrity of the most likely component to change its value, it is possible for other components, including the inverter control or chopper control, to also vary or fail. It is therefore desirable to confirm that signal frequencies are not introduced onto the wayside conductors. Referring again to FIG. 2, the switches 96, 96a are under the control of control 70 and are operative to pass either the $V_T$ and $I_L$ signals or the signals from generator 98 to the corresponding bandpass filters 100, 100a. The filter 100 is selected to pass only those signals having a predetermined signal frequency, e.g., 25 Hz. A signal out of filter 100 is therefore representative of any component of the $I_L$ signal having a frequency near the signal frequency during normal monitoring. During a test mode, a signal from filter 100 indicates that the filter and associated system are operating properly for passing signals of the predetermined frequency. While the $I_L$ signal is generally monitored to assure that signals corresponding to local signal frequencies are not being induced into the wayside power source, it is also desirable to monitor the $V_T$ signal to assure that other frequencies, such as 360 Hz, are present during regenerative braking. The systems for monitoring V and $I_L$ are essentially identical except for the frequency pass-band of the filters 100, 100a.

Referring briefly to FIG. 4, there is shown a passband characteristic of the band-pass filter 100. At the center frequency, i.e., the selected signal frequency such as 25 Hz, the filter 100 has maximum transmission. The upper and lower frequency test points, for example, the half-power points, are designed to encompass upper and lower frequencies which might interfere with the signal frequency. In the test mode, i.e., when the switch 96 passes signals from the generator 98 to filter 100, the control 70 monitors the response of the filter 100 to verify that its response corresponds to the waveform of FIG. 4.

The advantage of the system of FIG. 2 is that the frequency components of the $I_L$ and $V_T$ signals can be monitored with only a single control loop, i.e., no redundant control loops and electronic "voting" are necessary. This is possible since the self-test system of FIG. 2 assures the accuracy of the system. It will be recognized that the introduction of signal frequencies onto the wayside conductor is so critical that the propulsion system in any transit vehicle producing such signal frequencies is immediately disabled. Thus, while the system of FIG. 2 eliminates redundancy, it still assures integrity of the system by self-test.

Figure 5:
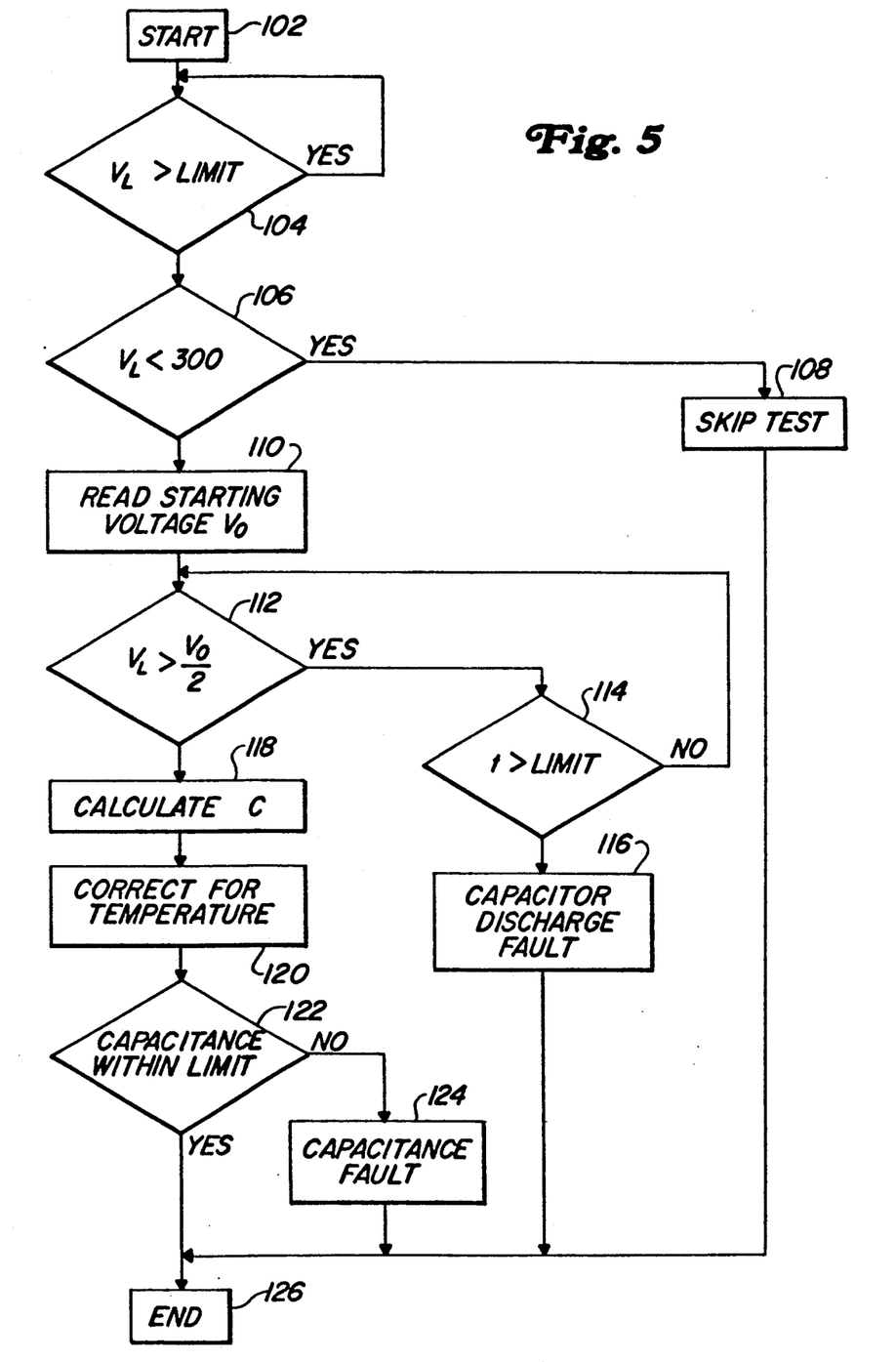
FIG. 5 is a flow chart of the program implemented for evaluating FIG. 3.

FIG. 5 is a flowchart for an illustrative program implemented in control 70 for evaluating capacitance value in the manner described with respect to FIGS. 2 and 3. Block 102 indicates an initializing step for control 70 for starting the evaluation process. Decision block 104 represents an evaluation of line voltage $V_L$ to determine whether $V_L$ has dropped to below a preselected limit, e.g., the aforementioned 400 volt limit at which the batter charge circuit is automatically disconnected. If $V_L$ is greater than this limit, the program loops until $V_L$ drops to below the limit. A second minimum limit of 300 volts, as discussed with regard to FIG. 2, is then compared to $V_L$ at decision block 106. If $V_L$ is less than this minimum limit, the program aborts, block 108. If $V_L$ is greater than 300 volts (and less than 400 volts), the program proceeds to block 110 and reads voltage $V_O$ (the present value of voltage $V_L$). $V_L$ is then monitored until its value drops to $\frac{1}{2} V_O$, block 112. Concurrently, time t is also monitored, block 114, for determining the time for the voltage to drop from $V_O$ to $V_O/2$. If time t becomes greater than a predetermined limit before $V_L$ reaches $V_O/2$, the program jumps to block 116, indicating a fault condition, and exits. Otherwise, the program steps to block 118 and calculates the capacitance value C based upon the time t for the voltage $V_L$ to change from $V_O$ to $V_O/2$. The calculated C value is corrected for temperature, block 120, and then compared to stored limit values, block 122. If the calculated value C is outside the stored limit values, a capacitance fault is indicated, block 124. Otherwise, the program ends, block 126.

Figure 6:
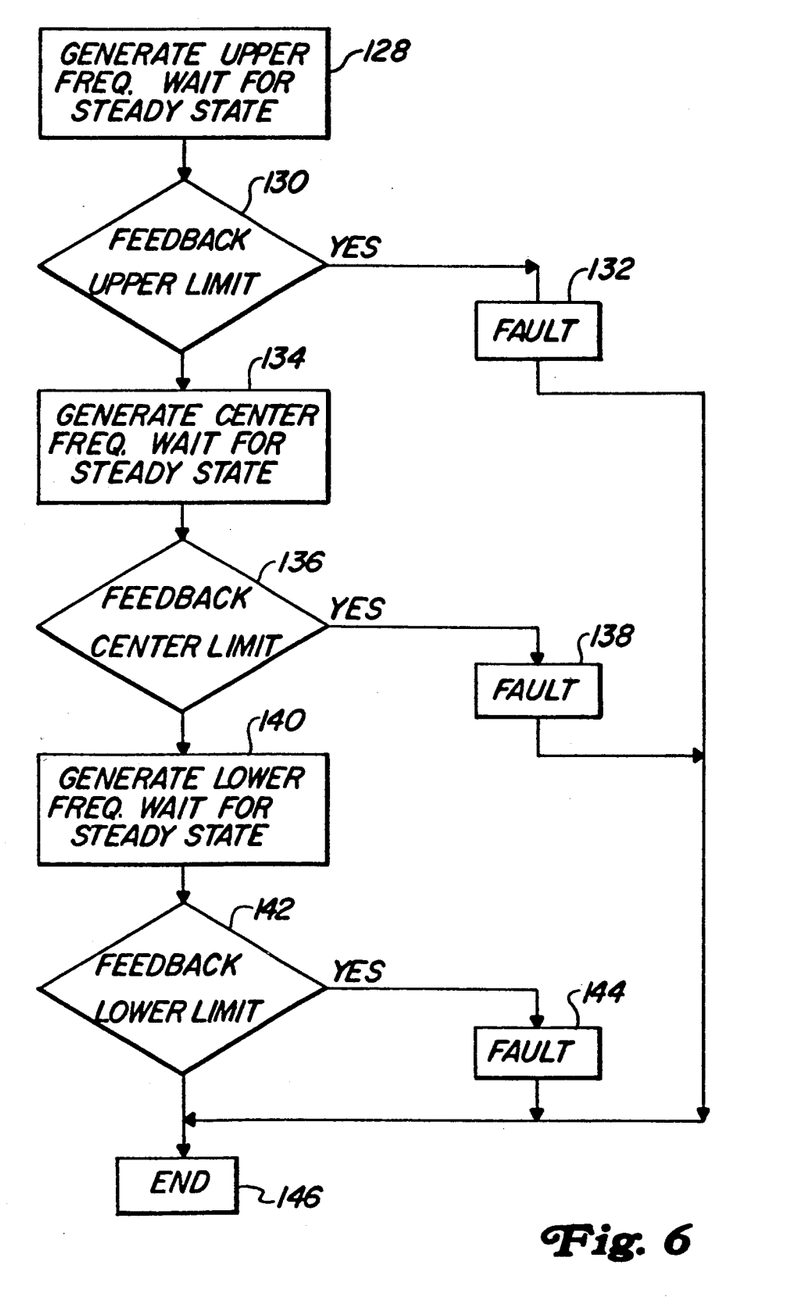
FIG. 6 is a flow chart of the program implemented for evaluating FIG. 4.

FIG. 6 is a flowchart for an illustrative method of evaluating whether the system can detect the introduction of underside frequencies onto the wayside power system. The apparatus for such evaluation is shown in FIG. 2 while the graph of FIG. 4 illustrates the conceptual method. In FIG. 6, a program operating in control 70 initiates generation of an upper frequency signal, block 128, and waits for the signal to stabilize. At block 130, the system determines if the upper frequency signal amplitude passing through the BP filters 100/100a is greater than a preselected limit. (See FIG. 4.) If the amplitude is above the limit, the program indicates a fault condition, block 132. Otherwise, the program effects generation of a center frequency signal, block 134. After a short wait period, the system determines if the amplitude of the center frequency signal is less than a preselected limit value, block 136, (the minimum magnitude in FIG. 4). If the passed value is less than the preselected value, the program indicates a fault, block 138, and exits. If the amplitude is satisfactory, the frequency test is repeated for a lower frequency test point, blocks 140 and 142, indicating a fault condition, block 144, if the lower frequency detected amplitude is greater than a preselected lower limit value. Otherwise, the program ends, block 146.

While the principles of the invention have now been made clear in an illustrative embodiment, it will become apparent to those skilled in the art that many modifications of the structures, arrangements, and components presented in the above illustrations may be made in the practice of the invention in order to develop alternate embodiments suitable to specific operating requirements without departing from the spirit and scope of the invention as set forth in the claims which follow.

What is claimed is:

1. A method for in-circuit verification of capacitance value of capacitor means in a power circuit, the circuit comprising a filter circuit, operatively connected to input power means for inhibiting transient current between a power system and the input power means, having at least one resistor selectively connectable in parallel circuit arrangement with the capacitor means, and further comprising monitoring means for providing signals indicative of voltage on the capacitor means, the at least one resistor having a predetermined resistance value, and computer means coupled for receiving the voltage indicative signals, the method comprising the steps of:

connecting the at least one resistor in parallel circuit arrangement with the capacitor means for causing voltage on the capacitor to discharge through the at least one resistor;

monitoring the voltage on the capacitor means with the monitoring means as the voltage discharges;

determining the time for the voltage on the capacitor means for discharge from a first preselected value to a second preselected value, wherein the second preselected value is predeterminately related to the first preselected value;

computing in the computer means, from the capacitor means discharge time and value for the at least one resistor, the capacitance value of the capacitor means in accordance with the expression $V=V_O e^{-t/RC}$, where $V_O$ is the value of the voltage at the first preselected value, V is the value of the voltage at the second preselected value, t is the time for the voltage to discharge from the first to the second preselected value, R is the value of the at least one resistor, and C is the computed capacitance value;

computing the second preselected value from the first preselected value;

inhibiting capacitance value verification when the determined discharge time exceeds a preselected time interval; and comparing voltage on the capacitor means to voltage on the input power means and inhibiting verification of capacitance value when the capacitor means voltage is greater than the input power means voltage.

2. The method of claim 1 further comprising the step of:

inhibiting verification of capacitance value when voltage one the capacitance means is less than a predetermined minimum value.

3. The method of claim 1 wherein the power system includes means for monitoring preselected frequency components on the input power lines, the method further comprising the step of:

verifying that the magnitude of the preselected frequency components is less than a predetermined value.

4. The method of claim 3 further comprising the steps of:

injecting a signal including the preselected frequency components onto the input power lines; and determining the response of the monitoring means to the injected signal for confirming operation of the monitoring means.

5. A method for in-circuit verification of capacitance value of capacitor means in a power circuit, the circuit comprising a filter circuit for a power system for an electric traction vehicle, the filter circuit being connected to input power lines of the traction vehicle for inhibiting transient current between the vehicle power system and the input power lines, and including at least one resistor selectively connectable in parallel circuit arrangement with the capacitor means and further including monitoring means for providing signals indicative of voltage on the capacitor means, the at least one resistor having a predetermined resistance value, and computer means coupled for receiving the voltage indicative signals, the method comprising the steps of:

connecting the at least one resistor in parallel circuit arrangement with the capacitor means for causing voltage on the capacitor to discharge through the at least one resistor;

monitoring the voltage on the capacitor means with the monitoring means as the voltage discharges;

determining the time for the voltage on the capacitor means for discharge from a first preselected value to a second preselected value;

computing in the computer means, from the capacitor means discharge time and value for the at least one resistor, the capacitance value of the capacitor means in accordance with the expression $V=V_O e^{-t/RC}$, where $V_O$ is the value of the voltage at the first preselected value, V is the value of the voltage at the second preselected value, t is the time for the voltage to discharge from the first to the second preselected value, R is the value of the at least one resistor, and C is the computed capacitance value;

computing the second preselected value from the first preselected value wherein the second preselected value is predeterminately related to the first preselected value; and comparing voltage on the capacitor means to voltage on the input power limes and inhibiting verification of capacitance value when the capacitor means voltage is greater than the input power lines voltage.

6. The method of claim 5 further comprising the step of:

inhibiting verification of capacitance value when voltage of the capacitance means is less than a predetermined minimum value.

7. The method of claim 5 further comprising the step of:

inhibiting capacitance value verification when the determined discharge time exceeds a preselected time interval.

8. The method of claim 5 wherein the power system further comprises:

means for monitoring preselected frequency components on the input power lines and the method further comprises the step of:

verifying that the magnitude of the preselected frequency components is less than a predetermined value.

9. The method of claim 8 further comprising the steps of:

injecting a signal including the preselected frequency components onto the input power lines and determining the response of the monitoring means to the injected signal for confirming operation of the monitoring means.

10. A system for in-circuit verification of capacitance value of capacitor means in a power circuit, the circuit comprising a filter circuit for a power system for an electric traction vehicle, the filter circuit being connected to input power lines of the traction vehicle for inhibiting transient coupled between the vehicle power system and the input power lines, and including at least one resistor selectively connectable in parallel circuit arrangement with the capacitor means and further including monitoring means for providing signals indicative of voltage on the capacitor means, the at least one resistor having a predetermined resistance value, and computer means coupled for receiving the voltage indicative signals, the system comprising:

means for connecting the at least one resistor in parallel circuit arrangement with the capacitor means for causing voltage on the capacitor to discharge through the at least one resistor;

means for monitoring the voltage on the capacitor means with the monitoring means as the voltage discharges;

means for determining the time for the voltage on the capacitor means for discharge from a first preselected value to a second preselected value;

means for computing from the capacitor means discharge time and value for the at least one resistor, the capacitance value of the capacitor means in accordance with the expression $V = V_O\, e^{-t/RC}$, where $V_O$ is the value of the voltage at the first preselected value, V is the value of the voltage at the second preselected value, t is the time for the voltage to discharge from the first to the second preselected value, R is the value of the at least one resistor, and C is the computed capacitance value;

means for computing the second preselected value from the first preselected value where the second preselected value is predeterminately related to the first preselected value; and means for comparing voltage on the capacitor means to voltage on the input power lines and for inhibiting verification of capacitance value when the capacitor means voltage is greater than the input power lines voltage.

11. The system of claim 10 further comprising:
means for inhibiting verification of capacitance value when voltage one the capacitance means is less than a predetermined minimum value.

12. The system of claim 10 further comprising:
means for inhibiting capacitance value verification when the determined discharge time exceeds a preselected time interval.

13. The system of claim 10 wherein the power system further comprises:
means for monitoring preselected frequency components on the input power lines; and means for verifying that the magnitude of the preselected frequency components is less than a predetermined value.

14. The system of claim 13 further comprising:
means for injecting a signal including the preselected frequency components onto the input power lines and determining the response of the monitoring means to the injected signal for confirming operation of the monitoring means.

* * * * *